(12) United States Patent
Kasuya et al.

(10) Patent No.: US 9,644,531 B2
(45) Date of Patent: May 9, 2017

(54) HYBRID DRIVE DEVICE

(71) Applicant: AISIN AW CO., LTD., Anjo-shi, Aichi-ken (JP)

(72) Inventors: Satoru Kasuya, Nishio (JP); Masashi Kito, Anjo (JP); Yuichi Seki, Okazaki (JP); Hiroki Shintani, Tokai (JP)

(73) Assignee: AISIN AW CO., LTD., Anjo (JP)

( * ) Notice: Subject to any disclaimer, the term of this patent is extended or adjusted under 35 U.S.C. 154(b) by 345 days.

(21) Appl. No.: 14/361,435

(22) PCT Filed: Feb. 8, 2013

(86) PCT No.: PCT/JP2013/053159
§ 371 (c)(1),
(2) Date: May 29, 2014

(87) PCT Pub. No.: WO2013/118901
PCT Pub. Date: Aug. 15, 2013

(65) Prior Publication Data
US 2014/0331945 A1  Nov. 13, 2014

(30) Foreign Application Priority Data

Feb. 10, 2012 (JP) ................. 2012-027850
Feb. 10, 2012 (JP) ................. 2012-027851
Jul. 13, 2012 (JP) ................. 2012-158159

(51) Int. Cl.
*F02B 63/04* (2006.01)
*B60K 6/26* (2007.10)
(Continued)

(52) U.S. Cl.
CPC .............. *F02B 63/042* (2013.01); *B60K 6/26* (2013.01); *B60K 6/387* (2013.01); *B60K 6/40* (2013.01);
(Continued)

(58) Field of Classification Search
CPC .... F02B 63/042; F16D 13/72; F16D 25/0638; F16D 25/123; F16D 13/74;
(Continued)

(56) References Cited

U.S. PATENT DOCUMENTS 8,555,748 B2  10/2013  Maekawa et al.
8,622,182 B2  1/2014  Iwase et al.
(Continued)

FOREIGN PATENT DOCUMENTS

DE  10 2009 042 933 A1  5/2010
JP  A-2004-1708  1/2004
(Continued)

OTHER PUBLICATIONS

Jul. 27, 2015 Office Action issued in U.S. Appl. No. 14/361,908.
(Continued)

*Primary Examiner* — Stephen K Cronin
*Assistant Examiner* — Jacob Amick
(74) *Attorney, Agent, or Firm* — Oliff PLC

(57) ABSTRACT

A hybrid drive having a clutch and a rotary electric machine disposed radially outwardly of the clutch so as to at least partially overlap the clutch in an axial direction as seen from a radially outer side, the rotary electric machine having a stator fixed to a case and a rotor coupled to the input member of the automatic transmission device. A clutch lubricating oil hole formed in a center shaft that extends at a center portion of the clutch and the rotary electric machine. A rotary electric machine lubricating oil hole formed in the center shaft. Separation means for separating lubricating oil such that lubricating oil from the clutch lubricating oil hole is led to the clutch and lubricating oil from the rotary electric machine lubricating oil hole is led to the rotary electric machine.

13 Claims, 3 Drawing Sheets

(51) Int. Cl.
*B60K 6/48* (2007.10)
*B60K 6/54* (2007.10)
*F16D 25/12* (2006.01)
*B60K 6/387* (2007.10)
*B60K 6/40* (2007.10)
*F16H 57/04* (2010.01)
*F16D 25/0638* (2006.01)

(52) U.S. Cl.
CPC .................. *B60K 6/48* (2013.01); *B60K 6/54* (2013.01); *F16D 25/123* (2013.01); *F16H 57/0476* (2013.01); *F16D 25/0638* (2013.01); *Y02T 10/6221* (2013.01); *Y10T 74/19014* (2015.01)

(58) Field of Classification Search
CPC ......... F16D 2300/06; B60K 6/26; B60K 6/54; B60K 6/387; B60K 6/40
See application file for complete search history.

(56) References Cited

U.S. PATENT DOCUMENTS

| | | | |
|---|---|---|---|
| 8,632,438 | B2 | 1/2014 | Kuroda et al. |
| 2004/0214686 | A1 | 10/2004 | Katou |
| 2005/0151429 | A1 | 7/2005 | Taketsuna et al. |
| 2008/0011529 | A1 | 1/2008 | Hoher et al. |
| 2009/0008212 | A1 | 1/2009 | Combes et al. |
| 2009/0283344 | A1 | 11/2009 | Arnold et al. |
| 2010/0109461 | A1* | 5/2010 | Kato ........................ B60K 6/26 310/90 |
| 2011/0121692 | A1 | 5/2011 | Iwase et al. |
| 2011/0240431 | A1 | 10/2011 | Iwase et al. |
| 2012/0032538 | A1* | 2/2012 | Kasuya .................... B60K 6/48 310/54 |
| 2012/0080248 | A1 | 4/2012 | Kasuya et al. |
| 2012/0080286 | A1 | 4/2012 | Kasuya et al. |
| 2012/0319514 | A1 | 12/2012 | Iwase et al. |

FOREIGN PATENT DOCUMENTS

| | | |
|---|---|---|
| JP | A-2004-324818 | 11/2004 |
| JP | 2006-248417 A | 9/2006 |
| JP | A-2006-298272 | 11/2006 |
| JP | A-2008-501566 | 1/2008 |
| JP | A-2008-24298 | 2/2008 |
| JP | A-2009-1127 | 1/2009 |
| JP | A-2009-72052 | 4/2009 |
| JP | A-2009-261214 | 11/2009 |
| JP | A-2010-105615 | 5/2010 |
| JP | A-2010-196868 | 9/2010 |
| JP | A-2010-276035 | 12/2010 |
| JP | A-2011-105192 | 6/2011 |
| JP | A-2011-152814 | 8/2011 |
| JP | A-2011-213230 | 10/2011 |
| JP | A-2011-214595 | 10/2011 |
| KR | 10-2009-0040543 | 4/2009 |
| KR | 10-2010-0008470 | 1/2010 |
| WO | 2004/019468 A | 3/2004 |
| WO | WO 2008/025691 A1 | 3/2008 |
| WO | WO 2012/017770 A1 | 2/2012 |
| WO | WO 2012/039378 A1 | 3/2012 |

OTHER PUBLICATIONS

International Search Report issued in International Patent Application No. PCT/JP2013/053159 dated May 7, 2013.
International Search Report issued in International Patent Application No. PCT/JP2013/053157 dated May 7, 2013.
International Search Report issued in International Patent Application No. PCT/JP2013/053160 dated May 7, 2013.
U.S. Appl. No. 14/361,908, filed on May 30, 2014 in the name of Kasuya et al.
U.S. Appl. No. 13/762,839, filed on Feb. 8, 2013 in the name of Kasuya et al.
U.S. Appl. No. 14/361,435, filed on May 29, 2014 in the name of Kasuya et al.

* cited by examiner

HYBRID DRIVE DEVICE

TECHNICAL FIELD

The present invention pertains to a hybrid drive device that has an internal combustion engine and a rotary electric machine (electric motor) as drive sources, and in particular relates to circulation of lubricating (cooling) oil in a one-motor hybrid drive device that transfers power from an internal combustion engine to an automatic transmission device via an engine disconnecting (K0) clutch.

BACKGROUND ART

There has conventionally been devised a one-motor hybrid drive device in which an output shaft (member) of an internal combustion engine is coupled to an input shaft (member) of an automatic transmission device via a K0 clutch and in which a rotor of an electric motor is coupled to the automatic transmission device. In general, the hybrid drive device starts the vehicle using the drive force of the electric motor, engages the K0 clutch when the vehicle is at a predetermined low speed to start the engine, and drives the vehicle using the drive force of the engine while performing shifting in the automatic transmission device. In this event, the electric motor outputs power so as to assist the drive force of the engine, generates electric power using the drive force of the engine or the inertial force of the vehicle, or idles.

In the case where the charge amount (SOC) of a battery is insufficient, the vehicle is started using power of the internal combustion engine. In this event, the K0 clutch functions as a starting clutch. When the engine is started by the electric motor and when the vehicle is started by the engine, the K0 clutch is subjected to slip control in order for a shock due to abrupt torque fluctuations between the input side and the output side of the K0 clutch to be avoided.

In the hybrid drive device, the electric motor is a large-diameter hollow motor, and the K0 clutch is disposed in the radially inner portion of the rotor of the motor to achieve downsizing and improve the efficiency of the electric motor. Lubricating oil is supplied from the input shaft of the automatic transmission device to the K0 clutch. After lubricating and cooling the K0 clutch, the lubricating oil flows toward a coil end of the electric motor (see Patent Document 1).

There is also known a system in which lubricating oil is spouted from the radially outer side of the electric motor to cool the electric motor.

RELATED-ART DOCUMENTS

Patent Documents

[Patent Document 1] Japanese Patent Application Publication No. 2009-72052 (JP 2009-72052 A)

SUMMARY OF THE INVENTION

Problem to be Solved by the Invention

A sufficient amount of lubricating oil is required to suppress heat generated from the K0 clutch during the slip control. In the case where the vehicle is started by the engine, in particular, it is necessary that the K0 clutch should be subjected to slip control for a relatively long time in order to generate creep torque before the vehicle is started. In the technology according to Patent Document 1, lubricating oil becomes hot through the slip control for the K0 clutch. When the hot lubricating oil flows to the coil end of the electric motor, the coil end may not be cooled well.

In lubrication and cooling through spouting from the radially outer side of the electric motor, spouting ports are provided only at a plurality of locations on the radially outer side of a stator, lubricating oil is distributed only around the predetermined locations on the stator, and the electric motor may not be lubricated and cooled over the entire circumference.

It is therefore an object of the present invention to provide a hybrid drive device that addresses the foregoing issues, in which clutch lubricating oil for axial core lubrication and rotary electric machine lubrication oil are separately supplied to a clutch and a rotary electric machine, respectively.

Means for Solving the Problem

The present invention provides a hybrid drive device (1) characterized by including:

a clutch (6) that engages and disengages an output member (5a) of an internal combustion engine (5) and an input member (7) of an automatic transmission device (2) with and from each other;

a rotary electric machine (3) disposed radially outwardly of the clutch so as to at least partially overlap the clutch in an axial direction as seen from a radially outer side, the rotary electric machine (3) having a stator (24) fixed to a case (123) and a rotor (25) coupled to the input member (7) of the automatic transmission device;

a clutch lubricating oil hole (143) formed in a center shaft (7, 5a) that extends at a center portion of the clutch (6) and the rotary electric machine (3);

a rotary electric machine lubricating oil hole (145) formed in the center shaft (7, 5a); and separation means (126, 187) for separating lubricating oil such that lubricating oil from the clutch lubricating oil hole (143) is led to the clutch (6) and lubricating oil from the rotary electric machine lubricating oil hole (145) is led to the rotary electric machine (3).

With reference to FIG. 2, for example, the hybrid drive device further includes a rotor support member (126) that has a cylindrical portion (126a) that holds the rotor (25), a flange portion (126b) that extends radially inward from the cylindrical portion, and a hub portion (126c) supported on the case (123, 122) via a bearing (130) at a radially inner end of the flange portion, and the clutch lubricating oil hole (143) opens (143b) toward a space (S) on one side of the flange portion (126b) in the axial direction;

the rotary electric machine lubricating oil hole (145) opens (145a) toward a space (G) on the other side of the flange portion (126b) in the axial direction;

the clutch (6) is disposed on the one side of the flange portion (126b) in the axial direction; and the separation means includes the rotor support member (126).

The hybrid drive device further includes a cover member (187) that covers a coil end (24a) disposed on one side of the stator in the axial direction, and the separation means includes the cover member (187).

The cover member is preferably made of a synthetic resin.

The clutch (6) has a clutch drum (128) coupled to the input member (7), a clutch hub (137) coupled to the output member (5a), outer friction plates (135a) splined to the clutch drum, inner friction plates (135b) splined to the clutch hub, and a hydraulic servo (136) disposed in the clutch drum to engage and disengage the outer friction plates and the inner friction plates with and from each other;

an outer peripheral surface of the clutch drum (128) is formed with splines (128c) and a through hole (128d), and the cylindrical portion (126a) of the rotor support member (126) is engaged with the clutch drum through the splines so as to rotate together with the clutch drum; and lubricating oil from the clutch lubricating oil hole (143) flows out of the clutch drum (128) through a gap (E) between a distal end of the clutch drum and the flange portion, the splines (128c), and the through hole (128d), and is discharged to the oil reservoir (166).

An oil passage (186) is formed on a radially inner side of the rotor (25) so as to extend in an axial direction of the rotor; and lubricating oil from the rotary electric machine lubricating oil passage (145) is supplied to a coil end (24b) disposed on the other side of the stator (24), and supplied to a coil end (24a) disposed on one side of the stator via the oil passage.

With reference to FIGS. 2 and 3, for example, the hybrid drive device further includes:

a resolver (12) disposed on the other side of the flange portion (126b) in the axial direction, the resolver having a stationary element (12a) integrally provided on the case (122) and a rotary element (12b) provided so as to rotate together with the rotor (25); and a bracket (185) that fixes the rotary element (12b) to an end portion of the cylindrical portion (126a) on the other side in the axial direction, and the bracket is formed with a void portion (J, K) communicated with the oil passage and the coil end (24b) disposed on the other side.

The symbols in the above parentheses are provided for reference to the drawings, and should not be construed as affecting the scope of the claims in any way.

Effects of the Invention

According to the invention of claim 1, lubricating oil from the clutch lubricating oil hole and lubricating oil from the rotary electric machine lubricating oil hole are separated by the separation means to be led to the clutch and the rotary electric machine, respectively, which makes it possible to reliably and accurately lubricate and cool the clutch and the rotary electric machine. In addition, lubricating oil from the rotary electric machine lubricating oil hole is uniformly supplied over the entire circumference of the rotary electric machine through axial core lubrication. In particular, hot lubricating oil after lubricating the clutch does not flow to the rotary electric machine. Thus, lubricating oil for the rotary electric machine supplied from the axial core can cool the rotary electric machine, in particular the coil ends thereof, to keep good performance of the rotary electric machine.

According to the invention of claim 2, clutch lubricating oil and rotary electric machine lubricating oil are separated by the flange portion of the rotor support member. Thus, lubrication and cooling of the clutch and the rotary electric machine can be secured with a simple structure.

According to the invention of claim 3, the coil end disposed on the one side on which the clutch is positioned is covered by the cover member. Thus, clutch lubricating oil after lubricating and cooling the clutch can be prevented from flowing to the coil end disposed on the other side.

If the cover member is made of a synthetic resin, the insulation distance between the case and the coil end can be shortened, which enables downsizing, in particular downsizing in the axial direction, of the hybrid drive device.

According to the invention of claim 4, lubricating oil from the clutch lubricating oil hole flows out of the clutch drum through the gap between the distal end of the clutch drum and the flange portion, the splines, and the through hole. Thus, lubricating oil after lubricating and cooling the clutch can be immediately and reliably discharged to decrease drag of the clutch while securing cooling of the clutch.

According to the invention of claim 5, lubricating oil from the rotary electric machine lubricating oil passage is led by the flange portion and the cylindrical portion of the rotor support member to be supplied to the rotary electric machine, in particular the coil end disposed on the other side thereof, and supplied to the coil end on the one side through the oil passage. This makes it possible to reliably cool the rotary electric machine, and to prevent deterioration in performance of the rotary electric machine due to heat.

According to the invention of claim 6, the resolver which detects rotation of the rotary electric machine is disposed on the other side of the flange portion, and the clutch is disposed on the one side of the flange portion. These both contribute to downsizing the hybrid drive device by effectively utilizing the space. The void portion on the bracket makes it possible to smoothly supply lubricating oil to the rotary electric machine without the resolver reducing the flow of rotary electric machine lubricating oil.

MODES FOR CARRYING OUT THE INVENTION

Figure 1:
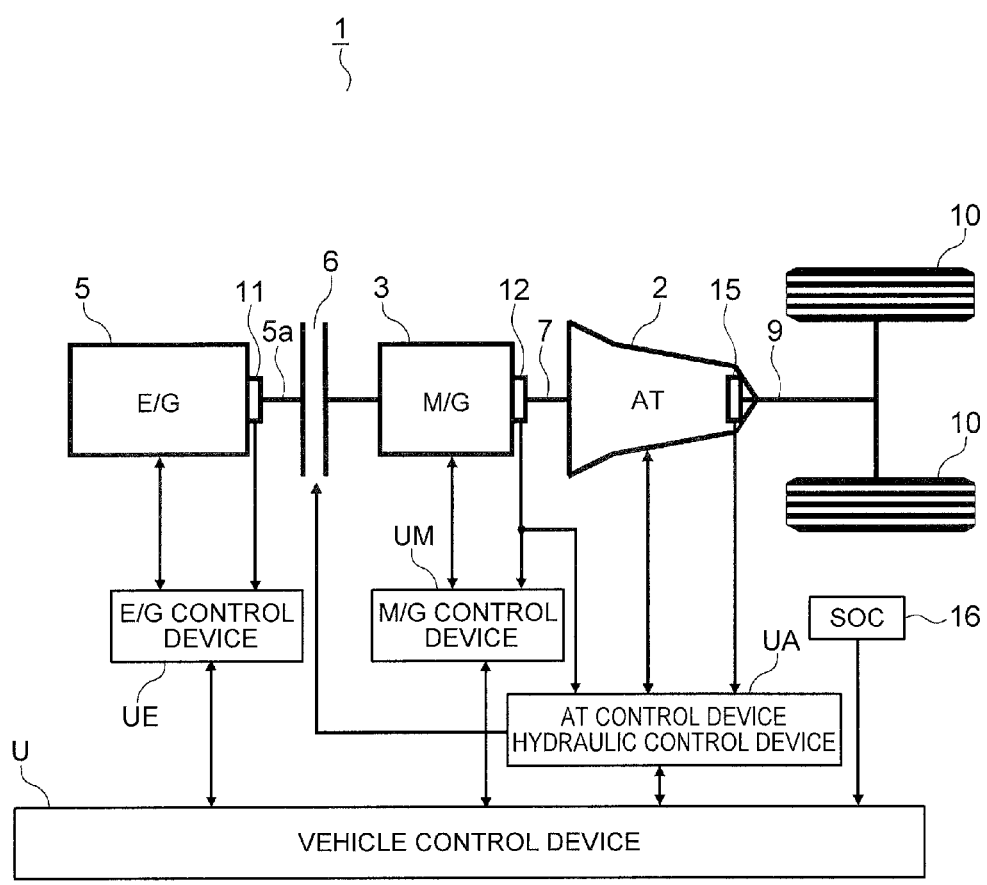
FIG. 1 is a schematic diagram illustrating a hybrid drive device to which the present invention can be applied.

An embodiment of the present invention will be described below with reference to the drawings. As illustrated in FIG. 1, a hybrid drive device 1 is a so-called one-motor type including an automatic transmission device 2, a rotary electric machine (hereinafter referred to as an electric motor) 3, and a disconnecting clutch 6 (hereinafter referred to as a K0 clutch) disposed between a rotary portion (rotor) of the electric motor 3 and an output shaft (coupling shaft) 5a of an internal combustion engine 5. An input member (hereinafter referred to as an input shaft) 7 of the automatic transmission device 2 is coupled to the rotary portion of the electric motor 3. An output member (hereinafter referred to as an output shaft) 9 of the automatic transmission device 2 is connected to drive wheels 10. The internal combustion engine 5, the electric motor 3, and the automatic transmission device 2 (including the K0 clutch 6) are controlled by an engine (E/G) control device UE, a motor (M/G) control device UM, and an automatic transmission/hydraulic (AT) control device UA, respectively. The control devices UE, UM, and UA are integrally controlled by a vehicle control device U. Signals from an engine rotational speed sensor 11, a rotational speed sensor 12 that senses the rotational speed of the electric motor and the input shaft 7 of the automatic transmission device, and an output shaft rotational speed sensor 15 are input to the control devices UE, UM, and UA. Further, a battery remaining amount (SOC) signal 16 is input to the vehicle control device U.

The electric motor (rotary electric machine) 3 functions as a drive source that converts electric energy into mechanical energy, as a generator that converts mechanical energy into electric energy, and further as a starter that starts the engine. The automatic transmission device 2 is a multi-speed transmission device with eight forward speeds and one reverse speed, for example. However, the automatic transmission device 2 is not limited thereto, and may be a continuously variable automatic transmission device such as a belt-type CVT, a cone ring-type CVT, and a toroidal-type CVT. The rotary electric machine may have only one of the functions as a drive source and a generator.

At normal times, when the battery remaining amount (SOC) is not insufficient, the hybrid drive device 1 starts the vehicle using the electric motor 3 as the drive source. That is, the vehicle is in the stationary state with a shift lever in a D (drive) range and with the automatic transmission device 2 establishing the first speed, and the electric motor 3 is in a creep state in which the electric motor 3 generates creep torque. When a driver depresses an accelerator pedal in this state, the electric motor 3 generates torque matching the accelerator operation amount. Torque of the electric motor 3 is transferred to the drive wheels 10 via the automatic transmission device 2 to start the vehicle. In this event, the K0 clutch 6 is in the disengaged state. Then, when the vehicle reaches a predetermined speed, the K0 clutch 6 is engaged to start the internal combustion engine 5 using torque of the electric motor 3. With the engine 5 started, rotation of the engine output shaft 5a is transferred to the drive wheels 10 via the automatic transmission device 2, and the vehicle speed is increased to a cruising speed by upshifting the automatic transmission device 2. In this event, the electric motor 3 outputs power so as to assist the engine torque, generates (regenerates) electric power using the engine torque or the inertial force of the vehicle, or rotates with no load.

In the case where the battery remaining amount (SOC) is insufficient, the hybrid drive device 1 starts the vehicle using the internal combustion engine 5 as the drive source. In this event, the K0 clutch 6 functions as the starting clutch. The internal combustion engine 5 is in the rotating state, the shift lever is in the D range, and the automatic transmission device 2 establishes the first speed. In the case where the driver depresses a brake in this state, the K0 clutch 6 as the starting clutch is in the non-engaged (disengaged) state. When the driver releases the depression on the brake, a start stand-by state is established, and the K0 clutch 6 is subjected to slip control. That is, the K0 clutch 6 is subjected to slip control to generate creep torque.

When the driver depresses the accelerator with the vehicle in the creep state, the working (supply) pressure is raised in accordance with the accelerator operation amount (required torque). The K0 clutch 6 increases its torque capacity while being subjected to slip control to start the vehicle, and is then completely engaged. In this state, output torque of the engine is directly transferred to the input shaft 7 of the automatic transmission device 2, and the automatic transmission device 2 is upshifted as appropriate to drive the vehicle. In this event, in general, the battery remaining amount is insufficient. Thus, the electric motor 3 functions as a generator, and generates electric power using power from the internal combustion engine 5.

Figure 2:
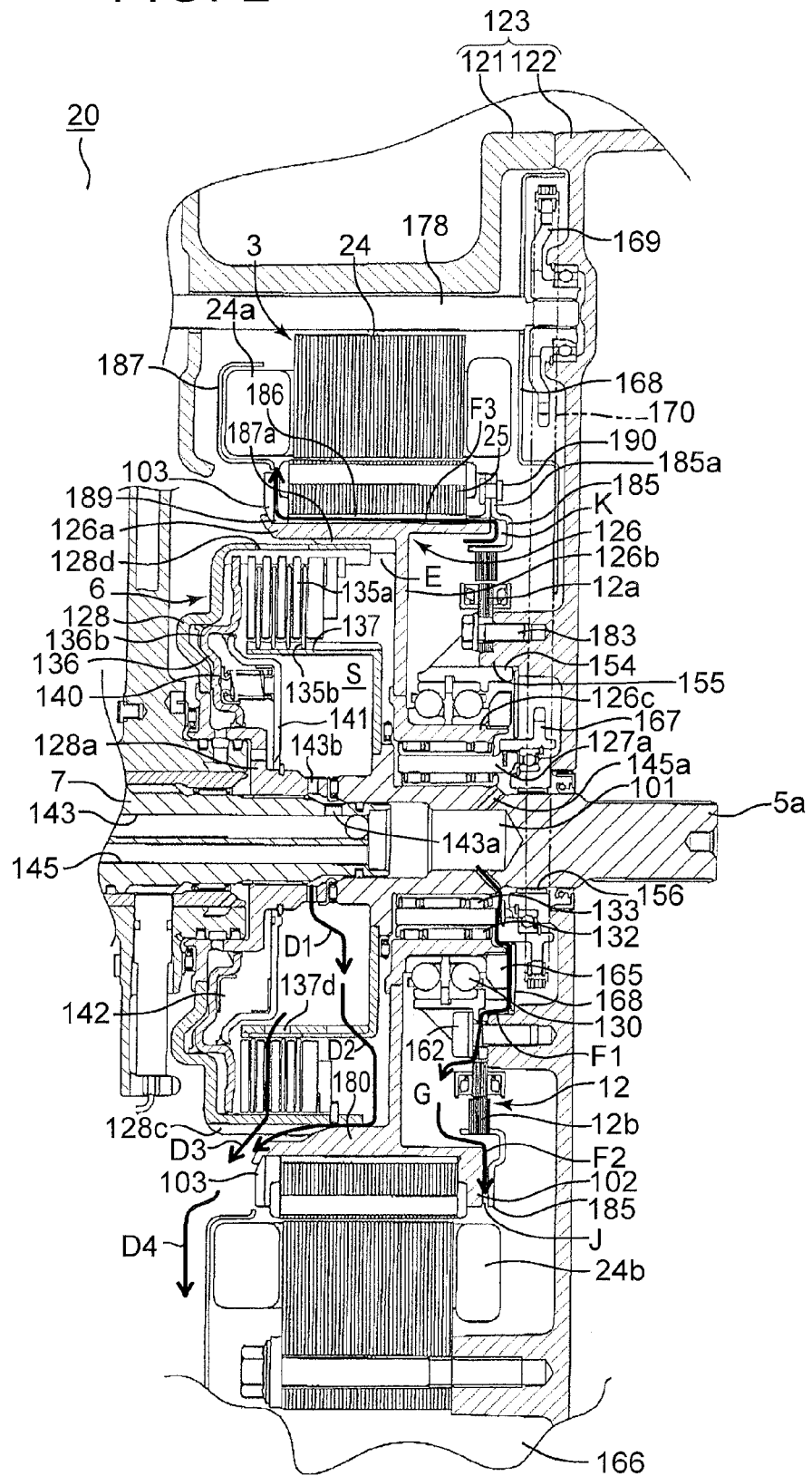
FIG. 2 is a sectional view illustrating an input portion (an electric motor and a disconnecting clutch) according to an embodiment of the present invention.

Next, an input portion composed of the K0 clutch 6 and the electric motor 3 will be described with reference to FIG. 2. An input portion 20 is housed in a combined case 123 composed of a transmission case 121 of the automatic transmission device 2 and a motor cover 122. The electric motor 3 is a large-diameter hollow motor, and includes a stator 24 integrally fixed to the case 123, and a rotor 25 as its rotary portion integrally provided to a rotor support member 126. The stator 24 is formed by winding a coil around an iron core. Coil ends 24a and 24b of the coil project from the iron core in the width direction (a direction that is parallel to the rotational axis).

The input shaft 7 of the automatic transmission device and the engine output shaft (coupling shaft) 5a are disposed at the center portion of the electric motor (rotary electric machine) 3 in alignment with each other. The two shafts are referred to as center shafts. Two oil holes 143 and 145 are formed in the input shaft 7 to extend in parallel with the axial direction. One of the oil holes, 143, is closed at its distal end (on the output shaft side), and opens toward the K0 clutch 6 via transverse holes 143a and 143b. The other oil hole 145 is communicated at its distal end with a fitting hole 101 and an inclined hole 145a formed in the output shaft 5a. The inclined hole 145a opens toward the electric motor 3. Thus, one of the oil holes serves as a clutch lubricating oil hole 143, and the other oil hole serves as a rotary electric machine (electric motor) lubricating oil hole 145.

The rotor support member 126 includes a cylindrical portion 126a that holds the rotor 25, a flange portion 126b that extends radially inward from the cylindrical portion, and a hub portion 126c integrally fixed to the radially inner end of the flange portion. An end plate 102 is provided at one end of the cylindrical portion 126a. The rotor 25 composed of a large number of thin plates is integrally held on the cylindrical portion 126a by mounting the rotor 25 to the cylindrical portion 126a and caulking the other end of the cylindrical portion 126a via a spacer 103.

A spigot portion 155 is coaxially formed on the motor cover 122 of the combined case 123 so as to surround a center hole 156. A cylindrical bearing holder 154 is fixed to the spigot portion by a bolt 162. The rotor support member 126 is rotatably supported in a cantilever manner via an angular contact ball bearing 130 interposed between the radially inner side of the bearing holder 154 and the radially outer side of the hub portion 126c. The ball bearing 130 is fastened by a nut 165 to be positioned in the axial direction and mounted.

A cylindrical pump drive member 127a is interposed between the radially inner surface of the hub portion 126c and the output shaft 5a. One-way clutches 132 and 133 are provided on the radially outer side and the radially inner side, respectively, of the pump drive member 127a. Thus, the faster one of rotation of the electric motor 3 and rotation of the internal combustion engine is transferred to the pump drive shaft 127a via the one-way clutch 132 or 133. That is, when the internal combustion engine 5 is started and the vehicle is started by the internal combustion engine, rotation of the engine output shaft 5a becomes higher than rotation of the electric motor 3. The power transfer to the pump drive shaft 127a is switched from the one-way clutch 132 on the outer side to the one-way clutch 133 on the inner side, and the pump 27 is driven by the engine output shaft 5a. The pump drive shaft 127a is coupled to a drive sprocket 167 rotatably supported on the output shaft 5a through a bearing. A driven sprocket 169 is rotatably supported on the radially outer side of the motor cover 122. A chain 170 is wound between the sprockets 167 and 169. A shaft 178 coupled to the driven sprocket 169 extends on the radially outer side of the stator 24 of the electric motor 3 toward the automatic transmission device, and is coupled to an oil pump (not illustrated). A cover 168 is provided to cover the drive sprocket 167, the driven sprocket 169, and the chain 170. The chain power transfer device is housed between the cover 168 and the motor cover 122.

The K0 clutch 6 is disposed on the automatic transmission device (one) side, in the axial direction, of the flange portion 126b of the rotor support member 126 and on the radially inner side of the cylindrical portion 126a. The K0 clutch 6 has a clutch drum 128 coupled to the input shaft 7, a clutch hub 137 coupled to the output shaft 5a, a number of outer friction plates 135a splined to the clutch drum, inner friction plates 135b splined to the clutch hub, and a hydraulic servo 136 that engages and disengages the friction plates with and from each other. The clutch drum 128 is in the shape of a bowl that is closed on one (automatic transmission device) side and that is open on the flange portion 126b side. A hub portion 128a of the clutch drum 128 on the closed side is splined to the input shaft 7. The hydraulic servo 136 is constituted from a cylinder that is the closed side of the clutch drum 128, and a piston 136b oil-tightly fitted with the cylinder. A return spring 140 is interposed and a cancellation oil chamber 142 is formed between the back surface of the piston and a back plate 141 retained on the hub portion 128a. The clutch hub 137 is integrally fixed to an expanded diameter portion of the output shaft 5a.

The clutch lubricating oil hole 143 opens (143b) into the clutch chamber S formed by the clutch drum 128 and the rotor support member 126, more particularly the space S formed by the clutch hub 137. A large number of spline projections 180 are formed on the radially inner side of the cylindrical portion 126a of the rotor support member 126. The projections are engaged with splines 128c formed on the outer peripheral surface of the clutch drum 128 to rotate together therewith. A gap E is formed between the distal end portion of the clutch drum 128 and the flange portion 126b of the rotor support member. In addition, oil passages are formed between the splines 128c on the outer peripheral surface of the drum and the cylindrical portion 126a. A through hole 128d is formed in the outer peripheral surface of the clutch drum 172. In addition, a through hole 137d is formed in the clutch hub 137.

The electric motor lubricating oil hole 145 opens (145a) toward a space G on the motor cover 122 side of the flange portion 126b of the rotor support member 126. Lubricating oil from the opening (145a) of the lubricating oil hole 145 is supplied to the space G through a gap between the nut 165 and the cover 168 as indicated by the arrow F1. A resolver (rotational speed sensor) 12 that detects the rotational speed and the phase of the electric motor 3 is disposed in the space G. The resolver is composed of a stationary element 12a fixed to the motor cover 122 (combined case 123) by a bolt 183, and a rotary element 12b fixed to the rotor support member 126 via a bracket 185. The stationary element 12a and the rotary element 12b are disposed in proximity to each other.

Figure 3:
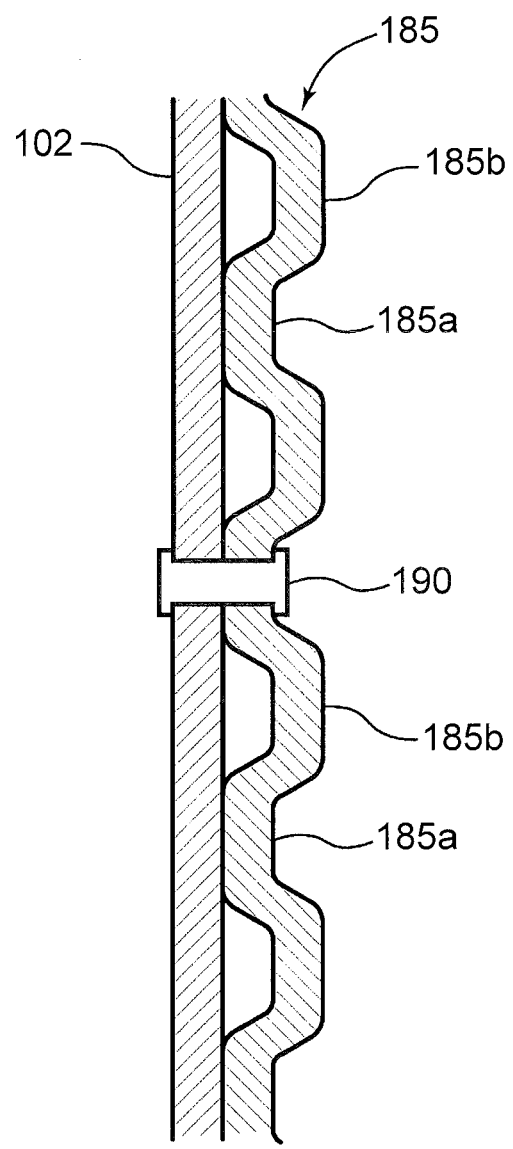
FIG. 3 is a plan view illustrating a bracket for attachment of a rotary element of a resolver to a rotor support member.

The radially outer side of the bracket 185 is fixed to the end plate 102 of the cylindrical portion 126a. The radially inner side of the bracket 185 is fixed to the rotary element 12b. As illustrated in FIG. 3, the bracket 185 is formed to be projected and recessed over the entire circumference. The bracket 185 is fixed to the end plate 102 by a rivet 190 at a recessed portion 185a (upper half of FIG. 2). A void portion J is formed between the end plate 102 and the bracket 185 at a projected portion 185b (lower half of FIG. 2). In addition, the radially inner portion of the bracket is bent in an angular U shape, and a void portion K is formed between one end of the cylindrical portion 126a and the radially inner portion of the bracket.

A recessed groove is formed in the radially inner surface of the rotor 25, which is composed of a large number of thin plates, to penetrate in the axial direction. The recessed groove forms an oil passage 186 between the outer peripheral surface of the cylindrical portion 126a of the rotor support member 126 and the rotor 25. The oil passage 186 extends from one end toward the other end of the cylindrical portion 126a. The oil passage 186 is communicated at the other end with an oil passage 189 formed in the spacer 103 to open in the radially outer direction of the rotor 25.

The coil end 24a disposed on one side of the stator 24 of the electric motor 3 is covered over the entire circumference by a cover member 187 that constitutes separation means that extends along the outer shape of the coil end 24a. The radially inner portion of the cover member forms a flanged portion 187a that hangs in the radially inner direction to receive lubricating oil from the oil passage 189 into the cover member and guide lubricating oil flowing along the outside surface of the spacer 103 to the outside of the cover member. The cover member 187 is formed from a synthetic resin, and electrically insulates the coil end 24a to shorten the insulation distance between the case 121 and the coil end 24a. This enables downsizing, in particular downsizing in the axial direction, of the hybrid drive device 1.

Next, the effect of the input portion 20 discussed above will be described. Lubricating oil from the clutch lubricating oil hole 143 is supplied from the transverse holes 143a and 143b (openings) to the clutch chamber (space) S as indicated by the arrow D1. Further, the lubricating oil lubricates and cools the outer friction plates 135a and the inner friction plates 135b, and is discharged out of the clutch drum 128 through the through hole 128d as indicated by the arrow D3. Meanwhile, a part of lubricating oil in the clutch chamber S passes through the gap E on the open side and the splines 128c, and is discharged toward one end of the cylindrical portion 126a.

This allows clutch lubricating oil supplied through the axial core lubrication (143) to be continuously supplied to the K0 clutch 6 and continuously discharged. It is possible to prevent the K0 clutch 6 from becoming excessively hot even if the K0 clutch 6 is subjected to slip control to be heated, and to reduce drag of the K0 clutch 6 due to lubricating oil in clutch chamber S continuously flowing.

Lubricating oil discharged out of the clutch drum 128 is blocked by the cover member 187 as indicated by the arrow D4, and hindered from flowing to the coil end 24a. In addition, lubricating oil flowing along the inner peripheral surface of the cylindrical portion 126a is led to the outside of the cover member 187 by the spacer 103 and the flanged portion 187a, and discharged to an oil reservoir 166 without flowing to the coil end 24a. Lubricating oil in the clutch chamber S is blocked by the rotor support member 126 and does not flow into the space G on the motor cover 122 side.

Lubricating oil from the electric motor lubricating oil hole 145 is supplied from the fitting hole 101 and the inclined hole (opening) 145a to the space G on the motor cover side separated by the flange portion 126b as indicated by the arrow F1. The resolver 12 is disposed in the space G, the K0 clutch 6 is disposed on the automatic transmission device (one) side of the flange portion 126b, and the oil pump is disposed on the radially outer side of the case 121. These all contribute to downsizing the hybrid drive device by effectively and reasonably utilizing the space, but hinders a smooth flow of lubricating oil from the space G to the electric motor 3.

The bracket 185 to which the rotary element 12b of the resolver 12 is attached is shaped to be projected and recessed. Thus, lubricating oil in the space G is supplied to the coil end 24b disposed on the motor cover (other) side of the stator 24 through the void portion J (see the lower portion of FIG. 2 and FIG. 3) to lubricate and cool the coil end 24b. On the other hand, lubricating oil from the void portion K on the bracket 185 is blocked from flowing in the radially outer direction by fixing the bracket 185 to the end plate 102 at the recessed portion 185a (see the upper portion of FIG. 8 and FIG. 9) as indicated by the arrow F3, and led through the oil passage 186 to flow toward one side of the rotor 25 in the axial direction. Then, the lubricating oil flows in the radially outer direction through the oil passage 189 at the end of the rotor 25 on the automatic transmission device side, is led by the flanged portion 187a to be supplied to the coil end 24a on one side inside the cover member 187, and lubricates and cools the coil end 24a on one side to be discharged to the oil reservoir 166.

Thus, the flange portion 126b and the cylindrical portion 126a of the rotor support member 126 and further the cover member 187 constitute the separation means for separating lubricating oil from the clutch lubricating oil hole 143 and lubricating oil from the electric motor lubricating oil hole 145. Lubricating oil from the clutch lubricating oil hole 143 is blocked by the separation means constituted from the cover member 187 from directly splashing on the coil end 24a even if the lubricating oil lubricates and cools the K0 clutch 6 to become hot. This prevents the coil end from becoming hot to degrade the performance of the electric motor 3. In addition, lubricating oil from the electric motor lubricating oil hole 145 is uniformly supplied over the entire circumference of the electric motor 3, and exclusively supplied to the electric motor 3 by the oil passage configuration discussed above. This makes it possible to effectively and sufficiently cool the electric motor 3.

Lubricating oil from the clutch lubricating oil hole 143 and lubricating oil from the electric motor lubricating oil hole 145 are separated from each other to be exclusively (mainly) supplied to the K0 clutch 6 and the electric motor 3, respectively, and it is not meant that all the lubricating oil is to be separated.

INDUSTRIAL APPLICABILITY

The present invention is utilized for a hybrid drive device to be mounted on an automobile, and in particular utilized as a lubricating device for a hybrid drive device having one motor in addition to an internal combustion engine.

DESCRIPTION OF THE REFERENCE NUMERALS

1 HYBRID DRIVE DEVICE
2 AUTOMATIC TRANSMISSION DEVICE
3 ROTARY ELECTRIC MACHINE (ELECTRIC MOTOR)
5 INTERNAL COMBUSTION ENGINE
5a OUTPUT MEMBER
6 (K0) CLUTCH
7 INPUT MEMBER
12 RESOLVER
12a STATIONARY ELEMENT
12b ROTARY ELEMENT
24 STATOR
24a, 24b COIL END
25 ROTOR
122 CASE (MOTOR COVER)
123 CASE
126 SEPARATION MEANS (ROTOR SUPPORT MEMBER)
126a CYLINDRICAL PORTION
126b FLANGE PORTION
126c HUB
128 CLUTCH DRUM
128c SPLINE
128d THROUGH HOLE
130 BEARING
135a OUTER FRICTION PLATE
135b INNER FRICTION PLATE
136 HYDRAULIC SERVO
143 CLUTCH LUBRICATING OIL HOLE
145 ROTARY ELECTRIC MACHINE (ELECTRIC MOTOR) LUBRICATING OIL HOLE
166 OIL RESERVOIR
185 BRACKET
186 OIL PASSAGE
187 SEPARATION MEANS (COVER MEMBER)

The invention claimed is:

1. A hybrid drive device comprising:
a clutch that engages and disengages an output member of an internal combustion engine and an input member of an automatic transmission device with and from each other; and
a rotary electric machine disposed radially outwardly of the clutch so as to at least partially overlap the clutch in an axial direction as seen from a radially outer side, the rotary electric machine having a stator fixed to a case and a rotor comprising a plurality of thin plates and coupled to the input member of the automatic transmission device;
a clutch lubricating oil hole formed in a center shaft that extends at a center portion of the clutch and the rotary electric machine;
a rotary electric machine lubricating oil hole formed in the center shaft; and
separation means for separating lubricating oil such that lubricating oil from the clutch lubricating oil hole is led to the clutch and lubricating oil from the rotary electric machine lubricating oil hole is led to the thin plates of the rotor or the stator of the rotary electric machine.

2. The hybrid drive device according to claim 1, further comprising:
a rotor support member that has a cylindrical portion that holds the rotor, a flange portion that extends radially inward from the cylindrical portion, and a hub portion supported on the case via a bearing at a radially inner end of the flange portion, wherein:
the clutch lubricating oil hole opens toward a space on one side of the flange portion in the axial direction;
the rotary electric machine lubricating oil hole opens toward a space on the other side of the flange portion in the axial direction;
the clutch is disposed on the one side of the flange portion in the axial direction; and
the separation means includes the rotor support member.

3. The hybrid drive device according to claim 2, further comprising:
a cover member that covers a coil end disposed on one side of the stator in the axial direction, wherein
the separation means includes the cover member.

4. The hybrid drive device according to claim 2, wherein:
the clutch has a clutch drum coupled to the input member, a clutch hub coupled to the output member, outer friction plates splined to the clutch drum, inner friction plates splined to the clutch hub, and a hydraulic servo disposed in the clutch drum to engage and disengage the outer friction plates and the inner friction plates with and from each other;
an outer peripheral surface of the clutch drum is formed with splines and a through hole, and the cylindrical portion of the rotor support member is engaged with the clutch drum through the splines so as to rotate together with the clutch drum; and
lubricating oil from the clutch lubricating oil hole flows out of the clutch drum through a gap between a distal end of the clutch drum and the flange portion, the splines, and the through hole, and is discharged to the oil reservoir.

5. The hybrid drive device according to claim 3, wherein:
the clutch has a clutch drum coupled to the input member, a clutch hub coupled to the output member, outer friction plates splined to the clutch drum, inner friction plates splined to the clutch hub, and a hydraulic servo disposed in the clutch drum to engage and disengage the outer friction plates and the inner friction plates with and from each other;
an outer peripheral surface of the clutch drum is formed with splines and a through hole, and the cylindrical portion of the rotor support member is engaged with the clutch drum through the splines so as to rotate together with the clutch drum; and
lubricating oil from the clutch lubricating oil hole flows out of the clutch drum through a gap between a distal end of the clutch drum and the flange portion, the splines, and the through hole, and is discharged to the oil reservoir.

6. The hybrid drive device according to claim 2, wherein:
an oil passage is formed on a radially inner side of the rotor so as to extend in an axial direction of the rotor; and
lubricating oil from the rotary electric machine lubricating oil passage is supplied to a coil end disposed on the other side of the stator, and supplied to a coil end disposed on one side of the stator via the oil passage.

7. The hybrid drive device according to claim 3 wherein:
an oil passage is formed on a radially inner side of the rotor so as to extend in an axial direction of the rotor; and
lubricating oil from the rotary electric machine lubricating oil passage is supplied to a coil end disposed on the other side of the stator, and supplied to a coil end disposed on one side of the stator via the oil passage.

8. The hybrid drive device according to claim 4, wherein:
an oil passage is formed on a radially inner side of the rotor so as to extend in an axial direction of the rotor; and
lubricating oil from the rotary electric machine lubricating oil passage is supplied to a coil end disposed on the other side of the stator, and supplied to a coil end disposed on one side of the stator via the oil passage.

9. The hybrid drive device according to claim 5, wherein:
an oil passage is formed on a radially inner side of the rotor so as to extend in an axial direction of the rotor; and
lubricating oil from the rotary electric machine lubricating oil passage is supplied to a coil end disposed on the other side of the stator, and supplied to a coil end disposed on one side of the stator via the oil passage.

10. The hybrid drive device according to claim 6, further comprising:
a resolver disposed on the other side of the flange portion in the axial direction, the resolver having a stationary element integrally provided on the case and a rotary element provided so as to rotate together with the rotor; and
a bracket that fixes the rotary element to an end portion of the cylindrical portion on the other side in the axial direction, wherein
the bracket is formed with a void portion communicated with the oil passage and the coil end disposed on the other side.

11. The hybrid drive device according to claim 7, further comprising:
a resolver disposed on the other side of the flange portion in the axial direction, the resolver having a stationary element integrally provided on the case and a rotary element provided so as to rotate together with the rotor; and
a bracket that fixes the rotary element to an end portion of the cylindrical portion on the other side in the axial direction, wherein
the bracket is formed with a void portion communicated with the oil passage and the coil end disposed on the other side.

12. The hybrid drive device according to claim 8, further comprising:
a resolver disposed on the other side of the flange portion in the axial direction, the resolver having a stationary element integrally provided on the case and a rotary element provided so as to rotate together with the rotor; and
a bracket that fixes the rotary element to an end portion of the cylindrical portion on the other side in the axial direction, wherein
the bracket is formed with a void portion communicated with the oil passage and the coil end disposed on the other side.

13. The hybrid drive device according to claim 9, further comprising:
a resolver disposed on the other side of the flange portion in the axial direction, the resolver having a stationary element integrally provided on the case and a rotary element provided so as to rotate together with the rotor; and
a bracket that fixes the rotary element to an end portion of the cylindrical portion on the other side in the axial direction, wherein
the bracket is formed with a void portion communicated with the oil passage and the coil end disposed on the other side.

* * * * *